United States Patent [19]

Hinterwaldner et al.

[11] Patent Number: 5,690,869
[45] Date of Patent: Nov. 25, 1997

[54] USE OF A POLYMER MATERIAL ON THE BASIS OF MODIFIED HYDROCOLLOIDS AS COVERING MATERIAL

[75] Inventors: Rudolf Hinterwaldner, Moosach-Altenburg; Bruno Hertrich, Munich; Wilfried Babel, Eberbach, all of Germany

[73] Assignee: omniTECHNIK, Munich, Germany

[21] Appl. No.: 537,665

[22] PCT Filed: Jun. 2, 1995

[86] PCT No.: PCT/EP95/02107

§ 371 Date: Oct. 5, 1995

§ 102(e) Date: Oct. 5, 1995

[87] PCT Pub. No.: WO95/33554

PCT Pub. Date: Dec. 14, 1995

[30] Foreign Application Priority Data

Jun. 6, 1994 [DE] Germany .................. 44 19 724.1

[51] Int. Cl.$^6$ .................. B01J 13/08; B01J 13/14
[52] U.S. Cl. .................. 264/4.1; 264/4.3; 264/4.6
[58] Field of Search .................. 264/4.1, 4.3, 4.6

[56] References Cited

U.S. PATENT DOCUMENTS 5,051,304  9/1991  David et al. .................. 264/4.1

Primary Examiner—Nathan M. Nutter
Attorney, Agent, or Firm—Niro, Scavone, Haller & Niro

[57] ABSTRACT

The present invention relates to the use of a polymer material based on modified hydrocolloids as covering material for critical working substances.

19 Claims, No Drawings

USE OF A POLYMER MATERIAL ON THE BASIS OF MODIFIED HYDROCOLLOIDS AS COVERING MATERIAL

The object of the invention is the use of a polymer material, based on modified hydrocolloids, as coating material.

The business economy, industry and handicraft as well as cottage industries have long been especially seeking and asking for packaging systems to be used with critical working materials, with which these materials can be temporarily and/or latently rendered inert for storage, handling and like purposes. By critical working materials there are meant inter alia dangerous, combustible, volatile, auto-oxidizable reactive, thermo-sensitive, polymerizable, and/or toxic compounds which, for example, react prematurely with one another, contaminate the environment and/or can harm man and beast. For dealing with critical working substances, there are a number of legal regulations, insofar as they fall, inter alia under the regulations concerning hazardous substances, hazardous material transports, the environment and work hygiene.

For temporarily rendering inert critical working materials, microencapsulation technology offers itself as an ideal packaging system. By microencapsulation there is meant the encapsulation of finely dispersed liquid and/or solid phases by coating them with film-forming polymers which are deposited on the material to be covered after emulsification and coacervation or a border surface polymerization. The resulting microcapsules have protective envelopes and can be dried into a powder. In this manner a number of working materials can be transformed into a "dry mass". The microcapsule content can then be released again as needed, thermal, mechanical, chemical or enzymatic action, insofar as the content substances are still present. Practical experiences however, especially those from uses in technical fields, show that the microcapsule wall materials known to this date are diffusion-tight—and therefore sufficiently stable in storage—only for a few specific capsule content substances. This is also one of the reasons why the microencapsulation techniques have prevailed only with a few product areas, such as, for example, a) Ink carriers in the coating of write-through papers b) Medicinal powders with perishable drugs, for preparations available for use with or without release properties or vitamins c) Fertilizers, insecticides, herbicides, pesticides and the like, as well as d) in screw-thread safeguarding agents.

While in the product areas a) to c) no diffusion-proof microcapsule walls are required, this is a basic precondition in the case of screw-thread safeguarding agents.

In order to be able to achieve diffusion tightness for storage times of up to 3 months only, the microcapsule walls had to be equipped in separate, expensive and time-consuming additional process steps with secondary or tertiary walls. Such measures often led to unsatisfactory results.

The causes leading to protective covering walls that are not tight with respect to the content substances are often of complicated nature. They depend not only on the number of wall layers, on their thickness and properties; to the essential causal parameters known to this date there belong, inter alia:

hardening of the protective covering walls of hydrocolloids with aldehydes, which leads to contractions drying, which contributes to the additional shrinkage of the protective covering wall reswellability of the hardened and unhardened protective covering wall in water and in polar, possibly water-containing, organic solvents substance inclusions in the protective covering wall, which build up so-called "verhikel" bridges, especially in liquid media poor bonding in protective covering walls of two and more layers among one another.

Accordingly, for use in the technical field, there are described in the patent literature a number of microencapsulated products, but most of which have not been able to find acceptance in industrial practice, inter alia because of deficient diffusion tightness and therewith deficient storage stability. Thus, in DE-OS 20 27 737 there is described a hardenable multi-component adhesive or casting-composition system in which, by complicated cross-over combinations of unsaturated polyester resins and polyepoxy resins and their hardening agents, there can be produced mixtures that can practically be handled by microencapsulation technology. Here, 4 reactants at least are necessary, so that the protective coating walls are characterized by inhomogeneous untightness. In consequence of excessively thick microcapsule walls, furthermore, no high capsule destruction quota is assured under application conditions. This system, accordingly, could not become widespread in industrial practice.

In DE-OS 17 69 353 there are described reinforcing and sealing agents which are used for the pre-coating of threaded coupling combinations. Here it is a matter of an epoxy-resin adhesive system in which the reaction partner "epoxy-resin" is present microencapsulated in non-meltable aminoplast polymerizate envelopes in a non-volatile hardening agent. The processing of these agents occurs from solvents that are not environment-friendly and labor hygiene-friendly, such as, for example chlorinated hydrocarbons and/or aromatics. In these solvents the protective coating walls have only a limited storage stability of maximally 3 months, because they are not diffusion-tight and partially nonresistant with respect to the solvents. For this reason this system has found only partial acceptance in practice.

For the production of the protective covering walls a large number of polymer substances have been proposed, among which the hydrocolloids along with synthetic polymers occupy a special position. What type of capsule wall material is used is determined very largely by the microencapsulation technique. This encapsulation technique can be subdivided into solvent systems and aqueous systems.

While microencapsulation in organic solvents has steadily lost importance for reasons of working safety (possible fire hazards and danger to the environment), microencapsulating in aqueous media has remained as universal technology, insofar as it is possible to work free from dispersion agents.

In microencapsulation in the aqueous phase there are needed, for the production of the protective covering walls, hydrocolloids and/or water-soluble synthetic polymers. These wall materials are inter alia: gelatins, gum arabic, cellulose derivatives, polysaccharides, urea- and/or melamine resins, polyurethane systems and the like.

In all of these aqueous microencapsulating systems it is of decisive importance that the substances to be encapsulated be insoluble in water, but dispersable—without damage—in water. Further, the substances to be encapsulated must be inert with respect to the wall material medium.

For the production of the microencapsulated substances the following main process steps are necessary (simply represented):

Preparation of a stable dispersion of the substance to be encapsulated in water

Preparation of a colloidal solution of the selected wall material

Bringing-together of the dispersion and the solution and thereupon releasing (Auslosung) of a solvation and coacervation so that the colloidal wall material solution can come to lie about the dispersed droplets of the substance to be encapsulated as a solvate covering.

After the forming of the microcapsules, these are separated from the aqueous medium and then washed, shrunk and possibly hardened with suitable hardening agents and dried. As hardening agents for hydrocolloids there are preferably used aldehydes, especially glutaraldehydes.

Further details for the microencapsulating technology can be learned inter alia from U.S. Pat. No. 4,978,483; 2,712,507 and GB-A 751 600; 872 438; 927 157 and 949 910 as well as "Asaji Kondo"/J Wade yon Valkenburg, "Microcapsule processing and Technology", Marcel Dekker Inc., New York—Basel, 1979.

Despite above-average endeavors with diverse microencapsulating techniques and conventional wall materials, above all with liquids (fluid) reaction systems, the technical world did not succeed in achieving a decisive breakthrough in the construction of storage-stable and waterproof protective covering walls. Only by additional finishing with the above-mentioned secondary or tertiary walls has such a goal been partially reached. Thereby—in consequence of the increased protective covering wall thicknesses—new critical parameters did arise in the destroying of the microcapsule walls. For there it proved that under application conditions the protective coating walls could not be broken open and destroyed, because the pressures, the torsional and shearing forces required were too high. Only by the use of protective covering bursting agents such as are described in DE-B 25 363 319 and 27 10 548, did partial solutions offer themselves for practical use.

The above-described disadvantages, and a number of other critical parameters, are only a few of the reasons for the relative insignificance of the microencapsulating techniques in the packaging of sensitive products and reaction systems, and their (insignificant) use in diverse fields of application in the areas of technology, pharmacology and foods. In addition, the absence of technical concepts and innovations as well as a lack of practicality, were and are obstacles to the opening up of new areas of application for microencapsulated substances.

The problem and aim of the present invention is to make ready a covering material which, with respect to the inner phase (capsule content substances) and the outer phase, is chemically and physically inert, diffusion-tight, stable in storage, resistant to water and/or solvents.

It has now been found that the use of hydrocolloids hardenable by polymerization, and singly or multiply substituted by ethylene unsaturated residues, leads to a covering or coating material with superior, advantageous properties.

The object of the invention, therefore, is the use of a polymer material, based on one or more modified hydrocolloids with a $\geq 0.1$ mass % (m %) content of polymerizable or cross-linkable groups of the general formula

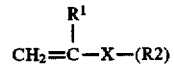

in which

X stands for —CO—, —COG—, —OCO—, —CONH—,

—CH$_2$, —O— or —NR$^3$;

R$^1$ stands for a hydrogen atom, a hydroxy-, nitrile-, halogen-, or C$_1$-C$_4$ alkyl residue;

R$^2$ stands for a saturated or unsaturated, at least divalent, hydrocarbon residue, which possibly has one or more substituents that are selected among a hydroxy-, amino-, C$_1$-C$_8$-alkyl-, C$_1$-C$_8$-alkoxy-, and/or a hydroxy-C$_1$-C$_8$ alkyl group, and which possibly has one or more hetero groups that are selected among —CO—, —OCOO—, —COO—, —OCO—, —O—, —S—, —NR4—, —NHCO—, —CONH—, —NHCONH—;

R$^3$ and R$^4$, which can be alike or different, stand for a hydrogen atom, a hydroxy-group or a C$_1$-C$_4$-alkyl residue and n stands for 0 or 1;

these groups being joined over a bonding member with the backbone (Ruckgrat) of the hydrocolloid, as covering or coating material for critical working substances.

By critical working substances in the sense of the present invention there are meant the substances defined at the outset and/or below, as well as pharmaceutical and cosmetic products. The polymer material is usable in particular as diffusion-tight covering material for the protection of the coated products against external effects and for reactive components as well as for protection of the environment from the properties of the coated products.

Especially preferred is the use of the polymer material as microcapsule wall material, as coating material for medicine forms or as material for macrocapsules, especially medicinal capsules.

When used as microcapsule wall material there can be packaged, in particular, dangerous, toxic, combustible, auto-oxidizable, volatile, thermosensitive and/or reactive working substances and reaction systems. In particular, polymerizable compounds, reactive compounds which harden according to the principle of polyaddition, compounds serving for hardening, (reactive) adhesives of sealing substances, plugging compositions (Dubelmassen), organoleptic, fragrant and/or smelling substances, coloring substances, dyes or paints, spreading substances, coatings, casing compositions, leavening and foaming agents; auto-oxidation-sensitive substances etc. can be packaged in a storage-stable and diffusion-tight manner.

By reaction systems in the sense of the present invention there are meant, inter alia:

all products of two and more components which react with and among one another after mixing and are cross-linkable by polymerization, polyaddition and polycondensation (examples of these are: reaction lacquers, reaction adhesives and reaction sealing substances) and/or products.

which change chemically and/or physically in dependence—also in one-component systems—on the particular environmental conditions, as, for example, by evaporation of content substances, oxidation and the like.

Especially in reaction systems it is of special importance that the protective coating walls, especially in liquid media, be diffusion-tight and develop no diaphragmatic or membranous properties. This critical parameter of diffusion-tightness is of essential importance if, for example, even very small amounts of an ingredient can move by migration and/or diffusion through the protective covering wall and prematurely trigger undesired reactions. Thereby undesired danger moments of the most diverse nature are preprogrammed and the product can no longer be supplied for its proper purpose of use.

The expression "diffusion-tight" comprises inter alia the following.

No exchange of content substances between the interior (microcapsule contents) and the outer phase and, conversely, by diffusion and/or migration during storage, whether in liquid media, dry substances and/or in a given environment.

For the appraisal and classification of the so-called diffusion-tightness of a wall material according to the present invention, there has been developed a testing process suitable for industrial practice. Here, the microencapsulated substances are stored for a predetermined time unit "X" in a suitable inert test medium, moved therein and/or, if need be, warmed. The test medium is preferably an inert organic solvent and/or water.

There are classified as diffusion-tight wall materials those materials which, during a given time unit "X" permit the migration or passage of $\leq$ than 5.0, advantageously of $\leq 3.0$ and especially of $\leq 1$ mass % of one or more microcapsule-content substances, into the inert outer test-medium phase.

The diffused and/or migrated content substances are then determined qualitatively and quantitatively by analysis, for example via gas-phase chromatography.

The coating material used according to the invention is based on functionalized hydrocolloids. The starting materials for its production are, inter alia, known and conventional hydrocolloids or their base raw materials. The chemical modification of the starting substances occurs by the introduction of side chains over reactive and/or functional groups into the main molecular chains, without in so doing changing or damaging the colloidal chemical and the water-soluble properties.

Through the obtaining of the colloidal chemical and, if need be, of the water-soluble properties after the chemical modification of the hydrocolloids, the covering materials can be used and processed according to conventional microcapsule techniques. The hydrocolloids modified according to the invention have, however, additional product parameters which, already before, during and/or after coacervation, have a strongly positive effect on the hardening and/or cross-linking. They contribute therewith essentially to the build-up and to the formation of inert, possibly waterproof and diffusion-tight covering materials.

The coating materials of the invention are reactive, biologically decomposable hydrocolloids or back-bone (Ruckgrat) polymers. They result from an at least partial derivation of the functional groups of the starting materials mentioned, for example hydroxyl-, amino-, imino-, thiol- and/or carboxyl groups, with a polymerizable residue of the general formula $$CH_2=C-X-(R^2)_n-$$
$$\phantom{CH_2=C}|\phantom{-X-(R^2)_n-}$$
$$\phantom{CH_2=C-X-}R^1$$

in which X, $R^1$, $R^2$ and n have the above signification, in a non-radical reaction. The residues introduced into the main molecular chains of the hydrocolloids according to the present invention are ethylene unsaturated residues. These can be joined with the hydrocolloids directly, or over the residue $R^2$, for example a bivalent, possibly substituted, aliphatic hydrocarbon or polyol residue. The bonding member between this residue and the polymer main chain is yielded, accordingly, from the reaction of the functional groups of the hydrocolloids with the corresponding reactive groups of the polymerizable residue mentioned. In particular it is a matter that the bonding member be of the same groups as the hetero groups of the residue $R^2$.

With the hydrocolloid derivatives used as coating materials according to the invention it is a matter of water-soluble polymer materials which are functionalized by means of ethyl unsaturated compounds according to the general formula appearing above. The residue $R^2$ is bonded there with at least one

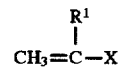

group, in which R and X can have the above signification and in which with several

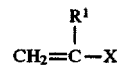

residues within the polymer material, the residues $R^1$ and X can in each case be alike or different. Possibly present hetero groups of the residue $R^2$ can be arranged both within the residue, namely in the aliphatic residues $R^2$, and/or at one or both ends of the residue $R^2$ as bridge members to X and A, respectively.

In an especially preferred form of execution $R^2$ is an at least bivalent, possibly substituted glycol- or polyol- residue with 2–6 C-atoms, the bivalent residue of an oxy- or hydroxycarboxylic acid with 2–18 C-atoms, or the bivalent residue of a carboxylic acid-$C_2$–$C_6$-glycol- or $C_6$–$C_{80}$-polyalkyleneglycol ester. In particular, the residue $R^2$ is a $C_1$–$C_4$-alkylene group which is possibly substituted with hydroxy-, amino-, and/or low alkyl groups. $R^2$ can, however, also have acyloxy-, carbonyl-, carbonyldioxy-, carmaoyl-, hydroxy-imino-, imino-, ureilene- and/or nitrile-bridge members (hetero groups). Quite especially preferred is the ureylene bridge member.

Preferably the residue $R^2$ is bonded with the hydrocolloid A over ether, ester and/or imino groups (Y=—O—, —OCO—, —COO— or —NR$^4$). Especially preferred is: $R^1$=H or $CH_3$; X=—COO—, —O— or —$CH^2$—; $R^2$=aliphatic hydrocarbon residue, in particular a $C_2$–$C_{10}$-alkylene residue or the residue $(CH^2CH_2O)_m$ with m=1 to 5. The functionalization of the hydrocolloids A with one or more reactive residues occurs especially over their hydroxyl-, amino-, imino-, thiol and/or carboxyl groups. The content of functional residues in the hydrocolloids A are $\geq 0.1$ m-%. The especially preferred contents lie in the range from 1 to 50 m-%, especially 5 to 30 m-%.

The starting material for the water-soluble, biologically decomposable hydrocolloids or vertebral polymers can come from the following polymer families:

Proteins: Polypeptides, especially those of collagen origin, such as, for example, gelatins, animal limes, whey proteins, caseins, vegetable proteins, especially soya proteins and the like, as well as their hydrolysates.

Polysaccharides: Cellulose and its derivatives, such as methyl cellulose, ethyl cellulose, hydroxyethyl cellulose, carboxymethyl cellulose etc., starch and starch derivatives, glycogen, alginic acid and derivatives, inclusive of salts, agar-agar, heteropolysaccharides, heteroglycanes, hemicelluloses and their derivatives, chitin, gum arabic and the like.

The derivation can occur by non-radical reaction or by graft reactions on the backbone (Ruckgrat) polymers.

According to the invention there are preferred, however, the functionalized backbone polymers or hydrocolloids, in which the reactive groups are introduced into the main molecular chains by means of a non-radical reaction. They contribute substantially to a homogeneous property spectrum, as was surprisingly found. The production of these functionalized products occurs according to methods that are known to the specialist for the introduction of such side chains. For example, the functional groups of the hydrocolloid can be made to react with a reactive derivative of the side chain residue or vice versa. Here there are to be mentioned the conversion of amino groups with corresponding alkyl- and acyl halides, acid anhydrides or epoxides, the conversion of hydroxy groups or thiol groups with corresponding alkyl and acyl halides, acid anhydrides, carboxylic acids or epoxides and the conversion of carboxyl groups with alcohols or epoxides, etc. The production of such polymer materials is described, for example, in DE-A-42 10 334, to which reference is made herewith. Accordingly, for the functionalizing there are suited a large number of unsaturated, in particular acryl-, methacryl- and allyl- group-carrying compounds according to the above formula. Especially preferred are reactive residues which are introduced into the hydrocolloid A inter alia over acrylic acid glycidyl esters, methacrylic acid glycidyl esters, acryloxyprionic acid glycidyl esters, methacryloxypropionic acid glycidyl esters, maleic acid monomethylacryloyloxiethyl esters, diurethane-methacrylate and allyl glyciyl carbonate, as well as (meth) acrylamide.

The polymerization necessary for the hardening can occur by homopolymerization of a hydrocolloid derivative containing the unsaturated residues or also by copolymerization of a mixture of such derivatives.

The polymerization or copolymerization required for the hardening occurs through addition or mixing, by spraying, coating and/or in a bath with the required reaction initiators for systems of this type. To these there belong inter alia Inorganic per-compounds such as, for example, hydrogen peroxide, alkali and alkaline-earth peroxides, persulfates, percarbonates Organic peroxides such as, for example, methylethyl ketone peroxides, cyclohexane peroxides, dibenzoyl peroxides, p-chloro-benzoyl peroxide, acetylacetone peroxide, cumolhydroperoxide and other initiators triggering polymerizations.

But also energy-rich beams such as, for example W beams in the presence of a photoinitiator, or electron beams, can start the polymerization and copolymerization.

Further, the polymerization and copolymerization after addition of one or more reaction initiators can be accelerated by addition of an accelerator, so that they can be carried out at lower temperatures. For this there are suited accelerators inter alia based on heavy metal salts such as, for example, cobalt acetyl acetonate, vanadium naphthenate; tertiary amines such as, for example, diethylaniline, diethyl-p-toluidine, triethanolamine.

The functionalized hydrocolloids according to the invention can be modified by further additions. Suitable additives are, inter alia, softeners, dyes, pigments, inorganic and/or organic fillers and fibers. Further there can be added stabilizers and/or inhibitors.

Especially preferred can be the use of mixtures of the hydrocolloids according to the invention with nonfunctionalized hydrocolloids if the coating materials have to fulfill specific functions such as, for example, partial swellability in water, as was surprisingly found.

In a number of cases the coating materials, especially the microcapsule walls must be rendered more strongly inert against specific chemical and/or environmental influences<than is achievable with the polymerizate cross-linking according to the invention. In order to reach this goal—in dependence on the particular media—the other functional groups present in the hydrocolloid serving for the hardening or cross-linking, can be made to react partially or completely or they can be rendered inert. To these there belong inter alia aldehydes, for example formaldehyde, acetaldehyde, glutaraldehyde, aldehyde group-carrying compounds, such as urea, melamine and/or phenol-aldehyde condensates, isocyanates and their pre-polymers, such as thiophosphoric acid-tris(p-isocyanate-phenylester), diphenyl-methane-4,4'-diisocyanate, hexamethylene diisocyanate.

Further, in individual cases a shrinking of the coating material, especially of the microcapsule walls, may be necessary. This shrinking occurs after the formation of the protective coating walls by means of known, conventional processes, such as, for example, treatment with sodium sulfate solutions.

For the formation of microcapsules all process techniques are suitable in which water-soluble hydrocolloids can be used. To these there belong inter alia:

Physical processes: Stationary extrusion centrifugal extrusion, rotating-plate processes, spray drying, air suspension processes, immersion, spraying, coating and the like.

Chemical processes: Boundary surface polymerization, coacervation, in-situ polymerization and the like.

The production of the microcapsules occurs as explained at the outset. The hardening or cross-linking of the protective coating walls can be carried out continuously and discontinuously. In free-radical hardening or cross-linking the microcapsules are placed in a bath in which the compounds serving for the hardening or cross-linking are dissolved and/or dispersed. As solvents water and/or organic solvents are suitable, water being preferred according to the invention. The concentrations of these hardener solutions are dependent on the particular hardening time and temperature desired. To accelerate the free-radical hardening or cross-linking, accelerating compounds can be added to the hardening solution, or be made in a separate accelerator bath used after the hardening. The hardening or cross-linking of the protective covering walls can also occur by spraying-on of the hardener and/or accelerator solutions.

The hardening or cross-linking of the microcapsule walls can also occur with energy-rich beams. In the hardening or cross-linking with UV beams there is or are to be added to the hydrocolloids of the invention one or more photosensitive compounds, such as, for example benzoin and its derivatives, benzildiemthyl ketals, 1-hydroxycyclohexyl-phenylketones, benzophenones, 2,4,6-trimethylbenzoyl-diphenyl-phosphine-oxides, alone or in combination with amino group-containing Co-initators, such as, for example, 2-(dimethylamino)ethyl benzoates. For the hardening or cross-linking with electron beams (ES) no initiator additives are needed. Radiation doses and exposure time are dependent, on the one hand, on the contents in reactive groups in the hydrocolloids according to the invention and, on the other hand on the microcapsule wall thicknesses and the content materials of the microcapsules. The exposure times lie there in general between 1 and 300 seconds in the W-cross-linking with W lamps with a power of 80 to 100 W/cm and in the ES cross-linking between 5 and 70 KGy.

For obtaining storage-stable, water resistant and/or diffusion-tight microcapsule walls, dual hardenings or cross-linkings may be indicated. By dual hardening or cross-linking according to the present invention it is meant that other functional groups present in the hydrocolloids A, which can react according to other reaction mechanisms, are made to react during and/or separately from, the free-radical hardening or cross-linking, with compounds suited to this end, and that serve for the hardening or cross-linking. As an example of this let there be mentioned the peroxide hardening or cross-linking and the reaction of —NH— and or OH— groups of the hydrocolloids A with isocyanate groups in one or two separate working steps.

By dual hardening or cross-linking it is possible inter alia to build up additional hydrophobe bridge members in protective coating wall material, whereby water resistance is substantially additionally improved and swellability by water can be substantially reduced, as was surprisingly found, without in the process worsening he the viscous elasticity (Zahelastizitat).

With the microcapsule wall materials of the invention further problems, in the enveloping and protecting of gases and particles of pastes and of dry substances, can be solved and simplified. In dependence on the particular physical and/or chemical microencapsulation techniques, above all in industrial production, reproducible parameters can be worked out and set in, because the hydrocolloids of the invention have more homogeneous properties in comparison to the conventional microencapsulating wall materials.

Thus, for example, compounds serving for the hardening or cross-linking can already be added to the solutions of the microcapsule wall materials. Especially suited for this are per- compounds and/or peroxides which become active as initiators only at raised temperatures and, therefore, have sufficient pot times. This has the advantage that the hardening or cross-linking can be initiated immediately after the formation of the protective coating walls. The hardening or cross-linking can be accelerated by the means that a solution of reaction accelerators is sprayed onto the protective coating walls and/or the microcapsules are brought into an accelerator bath.

The hardening or cross-linking of the protective coating walls can also be carried out in possibly tempered (temperierten) hardening and/or accelerating baths.

In the chemical microencapsulating techniques, especially in the coacervation process, the microcapsule materials of the invention offer further advantages, as was surprisingly found. In the bringing of a solution of the hydrocolloids of the invention into liquid media with dispersed particles or droplets to be enveloped (stable dispersion):

The wall materials are attached more rapidly to the dispersed particles or droplets and form more homogenous protective walls by coacervation;

the resulting microcapsule spectra have, according to the Gauss distribution curve, lower coefficients than the microcapsules produced with conventional hydrocolloids.

Further, with use of the hydrocolloids of the invention the free coacervate constituent is surprisingly low, whereby, inter alia, the washing times are appreciably shortened.

A further essential feature is the possibility of a homogeneous hardening or cross-linking and the formation of bridge members (cross-linking), in order to arrive at a more stable capsule wall matrix. By the hardening or cross-linking the hydrocolloids of the invention lose their sol./gel. transformation properties, which has an advantageous effect, inter alia, in the dehydrating and drying.

The points mentioned, i.e. the rapid formation of the protective coatings with the hydrocolloids of the invention, the uniform wall thicknesses of the microcapsules obtained and the obtaining of narrow microcapsule spectra with round and/or ellipsoidal microcapsule forms, are special advantages of the present invention.

With the present invention further essential problems in the dehydrating and drying of protective coating walls are solved. While in the dehydrating and drying of protective coatings of conventional hydrocolloids, which can be hardened with aldehydes, if need be, according to the state of the art, a number of very critical, changing parameters are given, these do not arise with use of the wall materials according to the invention. These critical parameters are substantiated in the case of the conventional protective cover wall materials inter alia by the fact that they have different degrees of hardening in consequence of inhomogeneous wall thicknesses, which contribute to the arising of inner tensions and therewith to cracking in the protective coverings they still have as gels (Gele) low melting points in consequence of the (partially) present sol.-/gel.-transformation properties and excessively long dehydration and drying times—often several days—at relatively low temperatures, even with use of modern drying techniques.

If, however, the protective coating walls consist of the hydrocolloids according to the present invention, then not only can the above and other disadvantages be eliminated but, as homogeneously hardened or cross-linked gels, these walls offer further advantages, as was surprisingly found. One of these advantages according to the invention is that the dehydrating and drying of the hardened or cross-linked protective coating gels can be brought about at rising temperatures—in a fraction of the time required with conventional hydrocolloids. Especially preferably in the dehydrating and drying according to the present invention the work is done with conditioned drying air, which has a relative air humidity of $\leq 50\%$, in particular of $\leq 40\%$, and drying air temperatures between 20° C. and 100° C.

Under such dehydrating conditions the protective coating gels according to the invention:

are lower in contraction and tension, preferably retain their more stable round and/or ellipsoidal form, can deactivate possibly present active groups.

Further, the hardened or cross-linked protective covering gels according to the present invention still need only a fraction of drying aids, such as, for example, the expensive pyrogenic silicic acid, in comparison to the conventional processes.

Further, the polymer material is suited for the coating of medicinal forms, especially coated pills, capsules and tablets. There, the polymer material can be chosen in such a way that there results either a gastric juice soluble coating or a gastric juice resistant coating.

The coating of medicament forms occurs in a usual manner, for example by spraying.

Further, the polymer material can also be used in the form of macrocapsules for the coating of the above-mentioned products. Here there are to be mentioned in particular medicine capsules. There is used then preferably a polymer material on a gelatin base. There can be produced both solid capsules and also insert-capsules (Steckkapseln). The production of the capsules occurs in a usual manner.

Using hydrocolloids according to the present invention as microcapsule wall materials, gives to a modern microencapsulation technology not only new impulses for the more economical production of protective coatings with functionally secure membrane properties and improved stability in storage, but also creates the preconditions for using them in industry and in trade. For truly storage-stable, waterproof and possibly diffusion-tight packaging systems, such as the microcapsules, offer the preconditions for temporarily rendering inert thermo-sensitive and/or reactive substances and systems that are dangerous, toxic, combustible, auto-oxidable, volatile, i.e. that evaporate and sublimate. The simplified process technology simultaneously proves highly economical The invention is explained in detail by the following examples, without, however, being restricted to these.

The wall materials used had the following technical characteristic data:

| Wall material A = derivative gelatin (according to the invention) | |
|---|---|
| Gelatinous strength according to Bloom: | 272 g |
| Viscosity according to Bloom/50° C. | 50 mPa · s |
| Glycidyl methacrylate content: | 1.7 mMol/g |
| Wall material B = unmodified gelatin (comparison) | |
| Gelatinous strength according to Bloom: | 272 g |
| Viscosity according to Bloom/50° C. | 50 mPa · s |

EXAMPLE 1 (according to the invention)

In a double-walled agitating container with a useful capacity of 100 liters and equipped with a stagelessly, regulatable agitating mechanism there were placed

| |
|---|
| 40.0 liters of water and |
| 2.0 kg of wall material A. |

The wall material A was allowed to swell in cold water and thereupon the preparation was warmed—without agitation—to about 45° C. This temperature of 45° C. was maintained. After the wall material A had dissolved, there were added, with agitating mechanism running, 0.5 kg of sodium polyphosphate and 0.3 kg of sodium acetate, and the whole was homogeneously intermixed.

Into this prepared wall material solution there were added 15 kg of benzoyl peroxide paste, 50%, in dibutylpthalate, well dispersed, and the residual amount of 10 ltr of water was added. Under agitation the pH value of the preparation was lowered, by means of a 10% acetic acid solution, to the coacervation point (ca. pH 4.2). Thereupon, cooling was performed slowly to a temperature of 10° C.

By addition of a 5% sodium hydroxide solution the pH value was adjusted to ca. 5 and a 50% glutaraldehyde solution was added for the preliminary hardening of the finished wall. This preliminary hardening with the glutaraldehyde solution lasted for ca. 24 hours. For the further hardening or cross-linking of the functional methacryl-groups of the wall material A there was added to the preparation ca. 0.250 kg of sodium peroxydisulfate ($Na_2S^2O^8$) that, by agitation, was homogeneously dissolved and distributed. For the acceleration of this reaction there were added 0.250 liters of 50i triethanolamine. After an agitating time of ca. 8 hours this hardening was concluded.

The resulting microcapsules were then allowed to settle and washing was carried out three times with fresh water.

After the washing process there was admixed a drying aid, for example pyrogenic silicic acid, and the microcapsule suspension was filtered.

The wet microcapsule cake obtained (60–70% water content) was thereupon dried in a fluidized-bed dryer with drying air temperature rising from 18° C. to 40° C. and a relative air humidity of ≦40%. The drying time was 18 hours. The microcapsules obtained were free-running individual capsules.

EXAMPLE 2 (according to the invention)

Example 1 was repeated in such manner that, instead of the benzoylperoxide paste there was encapsulated a 15 kg bi-phenol-A-dimethacrylate/trimethylolpropanetrimethacrylate mixture (1:1). The other process conditions corresponded to those in example 1. The drying time was 17 hours.

EXAMPLE 3 (comparison)

Example 1 was repeated in such manner thati instead of wall material A, wall material B was used.

EXAMPLE 4 (comparison)

Example 2 was repeated in such manner that, instead of wall material A, wall material B was used.

EXAMPLE 5 (according to the invention)

This example is distinguished from the preceding ones in that the hardening or cross-linking of the methacryl groups in the wall material A is initiated by the beginning of coacervation.

Example 2 was repeated in such manner that in the residual water addition amount of 10 ltr, before the beginning of coacervation 0.250 kg of sodium peroxydisulfate were dissolved and then added to the preparation. With the beginning of coacervation also the hardening or cross-linking of the wall material A was initiated. Since the free-radical hardening or cross-linking occurs more slowly in the acid range, no tensions were built up in the wall material and the hardening was more homogeneous and more stable. A glutaraldehyde hardening was dispensed with. Otherwise the procedure according to example 1 was followed The results are summarized in Table 1.

| | | Drying | | Diffusion in % after | | |
|---|---|---|---|---|---|---|
| Example No | Capsule size | (40% rel humidity) °C. | Residual moisture of the hrs microcapsule | 10 days | 90 days | Remark: |
| 1 (According to invention) | 50–120 | 18–40 | 18 ≦ 2.0 | 0.01 | 0.00 | individual capsules |
| 2 (according to invention) | 80–200 | 18–60 | 17 ≦ 2.0 | 0.02 | 0.03 | individual capsules |

-continued

| Example No | Capsule size | Drying (40% rel humidity) °C. | Residual moisture of the hrs microcapsule | Diffusion in % after 10 days | 90 days | Remark: |
|---|---|---|---|---|---|---|
| 3 (comparison) | 50–120 | 18–40 | 96 ≦ 2.0 | 2.1 | >5.0 | Cluster nests |
| 4 (comparison) | 80–200 | 18–60 | 48 ≦ 2.0 | 3.4 | >5.0 | Cluster nests |
| 5 (according to invention) | 40–100 | 20–80 | 12 ≦ 2.0 | 0.01 | 0.01 | individual capsules |

1 The diffusion-tightness of the microcapsule walls was tested in toluene. In a tight glass bottle there were weighed 90 parts by wt of toluene and 10 parts by wt of microcapsules and a suspension was formed therewith. The suspension was constantly shaken and after 10 and 90 days in each case a sample of the liquid toluene phase was taken and examined gas-chromatographically for the content in content substances.
2 In the case of peroxidic content substances the wall materials according to the invention have "self healing" effects by after-hardening.

EXAMPLE 6 (according to the invention)

For the production of tough-elastic (tough) microcapsule walls with low oxygen permeability there was used a glycerin allyl ether-modified gelatin with the following characteristic data:

| | |
|---|---|
| Gelatin strength according to Bloom: | 255 g |
| Viscosity according to Bloom/60° C.: | 25 mPa · s |
| Glycerin allyl ether content: | 1.9 mMol/g |

With this wall material an oxidation-sensitive coffee aroma was microencapsulated according to the process described in example 1. The glutaraldehyde preliminary hardening and the free-radical cross-linking with sodium peroxydisulfate were dispensed with. The hardening of the wall material occurred at the end of the drying with electron beams and a radiation dose of 20 kGy.—Parallel to this, from the wall material, films with a wall thickness of 15μ we produced in an analogous manner on a glass plate, in order to determine the oxygen permeability of the wall materials. The oxygen permeation (ASTM) amounted at 25° C./ 0% relative air humidity of 18 ml/d/m2/bar. The gelatin wall had tough elastic properties. The microencapsulated coffee aroma was checked again after 3 months of storage in daylight. The coffee aroma showed no changes in an organoleptic test, which changes would have been due to auto-oxidation.

EXAMPLE 7 (according to the invention)

For the microencapsulating of an epoxy resin (viscosity 750 mPa.s, epoxide value 0.54) there was used an acrylamide-modified gelatin with the following characteristic data:

| | |
|---|---|
| Gelatin strength according to Bloom: | 245 g |
| Viscosity according to Bloom/50° C.: | 45 mPa · s |
| Acrylamide groups content: | 1.68 mMol/g |

The microencapsulating occurred according to example 1.

The microcapsule walls were absolutely tight after toluol storage of 6 months. Moreover, it was not possible either to observe any "self-healing" effect on mechanically damaged microcapsule walls. This would presumably be due to the —NH groups from the acrylamide that have reacted with the epoxy groups of the epoxy resin.

EXAMPLE 8 (according to the invention)

For the coating of tablets (pills) there was selected a thin-boiling corn starch with a content of 1.4 mMol/g of glycidyl-methacrylate. The coating material had the following composition:

| | |
|---|---|
| 5.00 parts by wt of the above gelatin | |
| 12.00 parts by wt of the color pigment "red" with an iron oxides base | |
| 83.00 parts by wt of distilled water | |

The wall material was suspended in the cold distilled water and thereupon the suspension was heated in a glass beaker and briefly boiled. During cooling, the color pigment was dispersed into the starch solution obtained.

The coating material solution was then processed by means of an airless multicomponent spray gun. To the multicomponent nozzle there was simultaneously fed the hardener solution, consisting of a 10% potassium peroxydisulfate solution in water. The mixing ratio was 10:1 (starch solution to hardener). The spraying was done at 60° C.

Into a rotating drum there were put 1000 g of tablets and these were sprayed with coating material using an airless spray gun.

After 30 minutes the spraying process was terminated and the coated tablets were after-dried with a warm air stream (80° C.), in which process there simultaneously occurred an after-hardening of the acryl-modified starch.

The tablets presented a homogeneous, red coating layer, which was also stable under mechanical stresses.

We claim:

1. Polymeric microcapsule wall material comprising a modified hydrocolloid with a content of ≧0.1 mass % (m-%) of polymerizable or cross-linkable groups of the general formula:

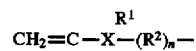

in which

X stands for —CO—, —COO—, —OCO—, —CONH—,

$R^1$ is a hydrogen atom, a hydroxy, nitrile, halogen, or $C_1$–$C_8$-alkyl residue;

$R^2$ is a saturated or unsaturated, at least bivalent hydrocarbon residue $R^3$ is a hydrogen atom, a hydroxy group or a $C_1$–$C_4$ alkyl residue;

n stands for 0 or 1; and these groups being linked over a linking member with the backbone of the hydrocolloid.

2. Microcapsule wall material according to claim 1, in which $R^1$ stands for a hydrogen atom or a $C_1$–$C_4$ alkyl group.

3. Microcapsule wall material according to claim 1 or 2, in which X stands for —COO—, —O— or $CH_2$—.

4. Microcapsule wall material according to claim 1, in which $R^2$ stands for an ethylene, propylene or butylene residue substituted by a hydroxy group or for a residue of the formula (—$OCH_2CH_2$—)$_m$, in which m stands for 1 to 5.

5. Microcapsule wall material according to claim 1, in which the polymerizable or cross-linkable groups originate from glycidyl acrylate or glycidyl methacrylate.

6. Microcapsule wall material according to claim 1, in which the linking member with the backbone of the hydrocolloid is selected from the group consisting of —CO—, —OCOO—, —COO—, —OCO—, —O—, —S—, —$NR^4$—, —NHCO—, —CONH— or NHCONH—.

7. Microcapsule wall material according to claim 1, in which the hydrocolloid is selected among a polypeptide of collagenous origin, especially gelatin, animal limes, collagens; caseins, whey proteins; vegetable proteins, in particular soya proteins, or a hydrolyzate thereof, and a polysaccharide, in particular cellulose or starch or a derivative thereof.

8. Microcapsule wall material according to claim 1, in which there are present in the hydrocolloid at least 10 cross-linkable groups per 1000 amino acids or monosaccharide units.

9. Microcapsule wall material according to claim 1, wherein said modified hydrocolloids are mixed with non-functionalized hydrocolloids.

10. Storage-stable microcapsules having a wall material as defined in claim 1.

11. Microcapsules according to claim 10, wherein said microcapsules are used for the packaging of dangerous, toxic, combustible, auto-oxidable volatile, thermosensitive and/or reactive substances and systems, or of medicines.

12. Microcapsules according to claim 10 wherein said microcapsules contain polymerizable compounds, including (meth)acryl allyl and/or vinyl group-carrying, hardenable compounds; reactive compounds which harden by polyaddition, including epoxide- and/or isocyanate-group-containing compounds; compounds serving for the hardening of reactive adhesive and sealing substances; sensory, aromatic and/or smelling substances; color-giving substances and/or dyestuffs; blowing and foaming agents; and/or auto-oxidation-sensitive substances.

13. A method for the formation of a microcapsule wall which comprises subjecting a modified hydrocolloid as defined in claim 1, in an aqueous medium, to coacervation and to a subsequent polymerization or cross-linking step, in the presence of the material to be encapsulated.

14. The method according to claim 13, comprising the further step of hardening the microcapsules.

15. The method according to claim 14, wherein said hardening step comprises dual hardening or cross-linking.

16. The method according to any of claims 13 wherein said coacervation and/or said polymerization step is accomplished under conditioned air with a relative air humidity of ≦50% and temperatures between 20° and 100° C., followed by an post- curing and drying of the microcapsule walls.

17. The polymeric microcapsule wall material of claim 1, wherein $R^2$ has a substituent which is selected from the group consisting of a hydroxy, amino, $c_1$–$C_8$ alkyl, $C_1$–$C_8$-alkoxy and/or hydroxy-$C_1C_8$-alkyl group.

18. The polymeric microcapsule wall material of claims 1 or 17, wherein $R^2$ has a hetero group that is selected from the group consisting of —CO—, —OCOO—, —COO—, —OCO——O—, —S—, —$NR^4$—, —NHCO—, —CONH—, —NHCONH—, and $R^4$, is a hydrogen atom, a hydroxy group or a $C_1$-$C_4$ alkyl residue.

19. The polymeric microcapsule wall material of claim 17, wherein $R^2$ has a hetero group that is selected from the group consisting of —CO—, —OCOO—, —COO—, —OCO—, —O—,—S—, —$NR^4$—, —NHCO—, —CONH—, —NHCONH—, and $R^4$, is a hydrogen atom, a hydroxy group or a $C_1$-$C_4$ alkyl residue.

* * * * *

UNITED STATES PATENT AND TRADEMARK OFFICE
CERTIFICATE OF CORRECTION

PATENT NO. : 5,690,869
DATED : November 25, 1997
INVENTOR(S) : Hinterwaldner et al.

It is certified that error appears in the above-identified patent and that said Letters Patent is hereby corrected as shown below:

Column 14, Lines 48-59, should read

in which

X stands for - CO -, - COO -, - OCO -, - CONH -, - CH -,

R

- CH -, or - O - or NR -

Column 14, Line 61, omit "$C_8$" and replace with "$C_4$"

Signed and Sealed this

Fifth Day of May, 1998

Attest:

BRUCE LEHMAN

Attesting Officer    Commissioner of Patents and Trademarks ent id="1" />

(12) REEXAMINATION CERTIFICATE (4407th)

United States Patent
Hinterwaldner et al.

(10) Number: US 5,690,869 C1
(45) Certificate Issued: Aug. 7, 2001

(54) USE OF A POLYMER MATERIAL ON THE BASIS OF MODIFIED HYDROCOLLOIDS AS COVERING MATERIAL

(75) Inventors: Rudolf Hinterwaldner, Moosach-Altenburg; Bruno Hertrich, Munich; Wilfried Babel, Eberbach, all of (DE)

(73) Assignee: Precote USA, Inc., McComb, MI (US)

Reexamination Request:
No. 90/005,625, Jan. 28, 2000

Reexamination Certificate for:
Patent No.: 5,690,869
Issued: Nov. 25, 1997
Appl. No.: 08/537,665
Filed: Oct. 5, 1995

Certificate of Correction issued May 5, 1998.

(22) PCT Filed: Jun. 2, 1995

(86) PCT No.: PCT/EP95/02107

§ 371 Date: Oct. 5, 1995

§ 102(e) Date: Oct. 5, 1995

(87) PCT Pub. No.: WO95/33554

PCT Pub. Date: Dec. 14, 1995

(30) Foreign Application Priority Data

Jun. 6, 1994 (DE) .................................. 44 19 724

(51) Int. Cl.$^7$ .............................. B01J 13/08; B01J 13/14
(52) U.S. Cl. ............... 264/4.1; 264/4.3; 264/4.6
(58) Field of Search ................ 264/4.1, 4.3, 4.6

(56) References Cited

U.S. PATENT DOCUMENTS 5,733,994  3/1998  Koepff et al. .................. 527/207

FOREIGN PATENT DOCUMENTS

WO 93/09176   5/1993   (WO).
WO 93/20119  10/1993   (WO).

*Primary Examiner*—Nathan M. Nutter

(57) ABSTRACT

The present invention relates to the use of a polymer material based on modified hydrocolloids as covering material for critical working substances.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 7 and 17–19 are cancelled.

Claims 1, 3 and 6 are determined to be patentable as amended.

Claims 5, 8–16, dependent on an amended claim, are determined to be patentable.

1. [Polymeric] *Diffusion tight polymeric* microcapsule wall material comprising a modified hydrocolloid with a content of $\geq 0.1$ mass % (m-%) of polymerizable or cross-linkable groups of the general formula:

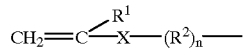

in which

X stands for [—CO—,] —COO—, [—OCO—,] —CONH—,

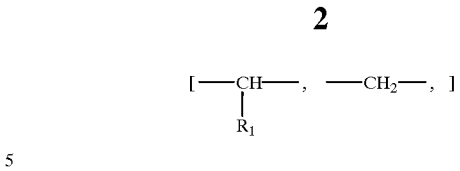

or —O— or $NR^3$—

$R^1$ is a hydrogen atom, [a hydroxy, nitrile, halogen,] or $C_1$–$C_4$-alkyl residue;

$R^2$ [is a saturated or unsaturated, at least bivalent hydrocarbon residue] *is an ethylene, propylene or butylene group substituted by a hydroxy group*;

$R^3$ is a hydrogen atom, a hydroxy group or a $C_1$–$C_4$ alkyl residue;

n stands for [0 or] 1; and these groups being linked over a linking member with the backbone of the hydrocolloid *and the hydrocolloid being selected among a polypeptide of collagenous origin, gelatin, animal glues, collagens; caseins, whey proteins; vegetable proteins, soya proteins, or a hydrolyzate thereof.*

3. Microcapsule wall material according to claim 1 [or 2], in which X stands for —COO—[,] *or* —O—[or $CH_2$—].

6. Microcapsule wall material according to claim 1, in which the linking member with the backbone of the hydrocolloid is selected from the group consisting of [—CO—, —OCOO—,] —COO—, [—OCO—,] —O—, —S—, *or* —$NR^4$—, [—NHCO—, —CONH— or NHCONH—] , *wherein $R^4$ is a hydrogen atom, a hydroxy group, or a $C_1$–$C_4$ alkyl residue.*

* * * * *